Patented Apr. 12, 1927.

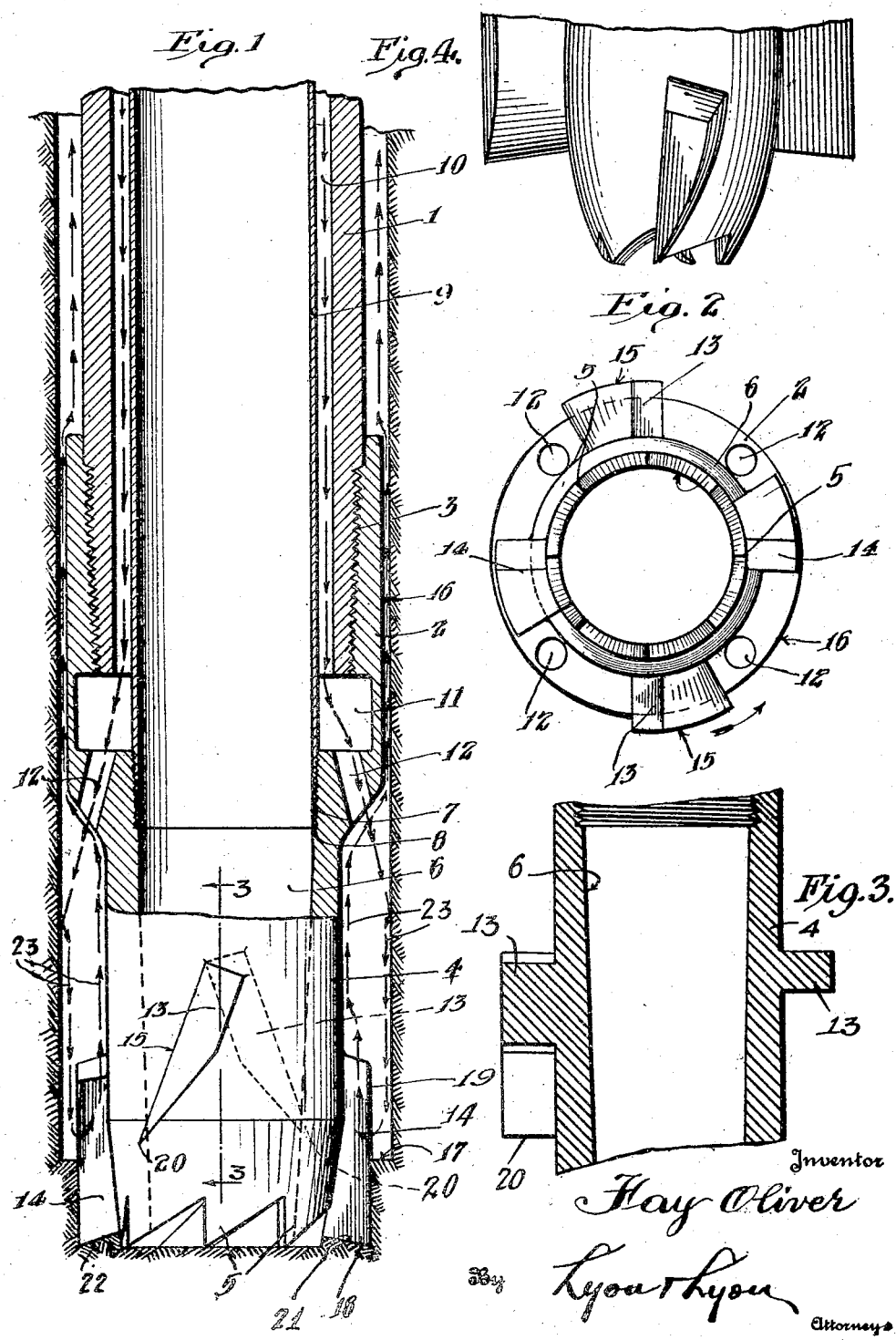

1,624,146

UNITED STATES PATENT OFFICE.

FAY OLIVER, OF WHITTIER, CALIFORNIA, ASSIGNOR, BY DIRECT AND MESNE ASSIGNMENTS, TO ELLIOTT CORE DRILLING COMPANY, A CORPORATION OF CALIFORNIA.

CORE DRILL.

Application filed February 16, 1925. Serial No. 9,455.

This invention relates to a core drill, and is more particularly directed to a core drill having a plurality of reaming and muddying cutters. In the art of core drilling, it is essential that the drill be provided with either water, mud or a like fluid during the operation of the drill to prevent the burning of the cutters and the core. It is also essential that the core drill be so constructed as to travel substantially a straight course in the hole during the taking of the core. Core drills, as now constructed and in common use, have a plurality of oppositely disposed reaming cutters, of which there are generally four, all arranged to cut on the same level and above the lower or cutting edge of the core drill.

It is extremely difficult to obtain a straight hole with such a core drill, although a good and efficient water shut-off from the core is obtained by the use of such a core drill. It is, therefore, an object of this invention to provide a core drill which will, when in operation in the hole, provide an efficient and effective water shut-off from the core being taken, and which is so constructed that the same will travel a straight, or substantially straight, path during the drilling operation.

It is a further object of this invention to provide a core drill which will form a hole in a stepped manner which drill will travel in a substantially straight path during the drilling operation.

It is an object of this invention to provide teeth on the outer cutters of such form that the same will form an obstruction in the ground to the passage of the flushing water or mud to the core so as to preserve the same.

It is an object of this invention to provide a core drill head having a plurality of teeth so located and of such construction on the core drill head that the cutting of the lower cutters will prevent the direct flow of the flushing water to the core but will enable sufficient quantity of the flushing water to reach the teeth at their lowest point to prevent the same from "burning" or rather to provide a lubricant for the cutters during their drilling operation so that the same are not rapidly worn away.

Other objects and advantages of this invention will be apparent from the following detailed description of a preferred embodiment thereof as shown in the accompanying drawings.

In the drawings:

Fig. 1 is a side elevation of a core drill embodying this invention, illustrating the core-receiving and outer-barrels in sectional side elevation.

Fig. 2 is a bottom plan view thereof.

Fig. 3 is a cross sectional view thereof taken substantially on the line 3—3 of Fig. 1.

Fig. 4 is a side elevational, detail view at right angles to Fig. 1.

In the preferred form of this invention illustrated in the accompanying drawings, 1 illustrates an outer barrel which may be a continuation of the drilling string, which barrel 1 is screw threaded to a hollow core drill head 2 as illustrated at the taper threads 3. The core drill head 2 is of reduced diameter at its lower end 4, and tapered downwardly and inwardly to the bottom where cutting teeth 5 are formed providing an annular core cutting member, such cutting teeth 5 being of any suitable form well understood in the art. The core drill head 2 has a core-receiving chamber 6 formed in the end 4, which receiving chamber 6 is preferably of circular cross section and is slightly tapered outwardly and upwardly from the teeth 5. Tapered threads 7 are formed at the upper portion of the chamber 6 and are of larger diameter than the chamber 6 at this point so as to provide a shoulder 8 so that when the inner or core-receiving barrel 9 is screwed up on the tapered threads 7 the lower edge of the inner barrel 9 abuts the shoulder 8 and provides a continuation of the chamber 6 without forming a shoulder at this point so as to permit the free travel of the core into the core-receiving barrel 9. Between the core-receiving barrel 9 and the outer barrel 1 is a passage 10 which permits the flow of water or mud or similar fluid into the enlarged circumferential chamber 11 which communicates with a plurality of downwardly and outwardly diverging ports 12, which ports 12 are formed so as to permit the flow of the fluid between the reaming cutters or blades 13 and initial or pilot cutters 14 and diverge outwardly so as to direct the fluid outward against the wall or sides of the hole. The cutters or blades 14, which make the initial enlarged cut are of sufficient cutting diameter to permit the flushing fluid to wash away the cuttings formed and keep the teeth cool. The cutters 13 and 14 are angularly disposed on the head with their cutting edge forwardly with respect to the direction of rotation of the drill so that the flushing fluid will maintain their cutting edges clean.

The reaming or secondary cutters 13 present a cutting edge 15 for reaming the hole as the core drill is operated in the direction indicated by the arrows in Fig. 2, these reaming cutters 13, of which there are preferably two, are oppositely spaced upon the reduced portion 4 of the core drill head 2 with their cutting edges at a point or points above the cutting edges of the blades 14. The reamers 13 extend outwardly slightly beyond the external face 16 of the drill head 2 as shown in Fig. 2, so as to ream the hole to a diameter sufficient to allow the free passage of the drill head 2 so that the same will not bind or rub against the sides of the wall. The initial or pilot cutters 14 are arranged below the reaming cutters 13 and extend downwardly and substantially form at their lower ends an outwardly extending continuation of the cutting teeth 5. The initial or pilot cutters 14 extend outward beyond the reduced portion 4 of the core drill head 2, a lesser distance than the reaming cutters 13 so that a shoulder 17 is formed in the formation during the drilling operation. While the cutters 14, at their lower ends 18, act partly as reamers in extending the hole formed beyond the sphere of activity of the cutting teeth 5, the portion 19 of these cutters acts to stir the fluid admitted through the ports 12 and the formation cut in a manner to prevent the flow of this fluid against the core being formed by the teeth 5. In this manner it is assured that the fluid will not get to the core 5 and act to disintegrate the core which it is desired to take. Both the cutters 13 and 14 are tapered to a cutting edge 20, 21.

The lower edge 21 of the cutters 14 is tapered inwardly so that the cutters 14 present at their outer edge a cutting point and a ridge 22 is found at the lower portion of the well hole which aids in preventing the flushing water from reaching the core being taken. The cuttings formed by the teeth 5 and cutters 14 travel upward through the space formed between the tapered portion of the head 4 and the wall of the well hole formed by the edge 19 of the cutters 14 and the upward travel of these cuttings prevents the flushing water from being injected toward the core being formed, the travel of the flushing water being substantially as illustrated at 23 in Figure 1.

With a drill constructed in accordance with the provisions as above related, it is assured that a continuous and perfect core will be formed, which will accurately enable the operator to determine the characteristics of the formation through which the drill is passing.

The cutters 13 and 14 are preferably formed integral with the reduced portion 4 of the core drill head 2, and are easily built up when worn. The reaming cutters 13, of which there are two are arranged with their cutting edges above the cutting edges of the cutters 14, whereby the cutters 13 and 14 cut successively, the cutting edge of one, as 13, following the cutting edge of the other, as 14. This insures that the drill will form a straight hole, which is not the case when four cutting members are formed on the head in the same longitudinal plane.

The tapering inwardly of the lower end of the head is an important feature of the core drill above described as while it is desirable to have the head of strong and durable structure, this tapering of the lower end permits the use of narrow teeth on the annular core cutter which cuts a clean core and also permits the use of substantial initial cutting blades of comparatively narrow width.

While I have shown the cutting edges of the blades 14 as tapered inwardly it is to be understood that such cutting edges may be made of other form so long as the cutting edges of the initial or pilot blades or cutters 14 perform their cutting operation at substantially the same level as the teeth of the annular cutter.

Having fully described a preferred embodiment of this invention, it is to be understood that applicant does not intend to limit this invention to the specific construction herein set forth which may obviously be varied in detail without departing from the spirit of the appended claims.

I claim:

1. In a rotary core drill, the combination of a hollow core drill head having an exteriorly downwardly tapered portion terminating in an annular cutter at its lower end, a plurality of initial cutting blades on said tapered portion of the head extending outwardly beyond said annular cutter, and a plurality of reaming blades on said head extending outwardly beyond said initial cutting blades, the cutting edges of the reaming blades being above the cutting edges of the initial cutting blades.

2. In a rotary core drill, the combination of a core drill head having an annular cutter formed at its lower end, a plurality of initial cutters integral with said head, a plurality of reaming cutters formed on said head of greater cutting diameter than the initial cutters, said initial cutters extending from approximately the lower end of the head to a point above the lower end of the reaming cutters to overlap the same, and a core receiving barrel extending upwardly from said head.

3. In a rotary core drill, the combination of a core drill head having a reduced portion terminating in an exteriorly downwardly and inwardly tapered portion having an annular cutter formed on the lower end of said tapered portion, a plurality of initial cutters having their cutting edges substantially at the level of the cutting edges of the annular cutter and extending outwardly therefrom, and a plurality of reaming cutters on said head extending outwardly beyond said initial cutters and having their cutting edges above the cutting edges of said initial cutters.

4. In a rotary core drill, the combination of a core drill head terminating in an exteriorly downwardly and inwardly tapered portion having an annular cutter formed on the lower end of said tapered portion, a plurality of initial cutters having their cutting edges substantially at the level of the cutting edges of the annular cutter and extending outwardly therefrom, and a plurality of reaming cutters on said head extending outwardly beyond said initial cutters and having their cutting edges above the cutting edges of said initial cutters.

5. In a rotary core drill, the combination of a core drill head having a reduced portion with an inwardly and downwardly tapered lower end terminating in an annular toothed core cutter, and a plurality of cutting blades formed on said head having cutting edges at substantially the same level as said annular core cutter, said blades extending outwardly from said annular core cutter and having a greater cutting diameter than said annular cutter.

6. In a rotary core drill, the combination of a core drill head having an exteriorly tapered lower end terminating in an annular toothed cutter, and a plurality of outwardly extending cutting blades on said tapered portion, having their cutting edges lower at their outer end than at their inner end, the cutting edges of said blades and said annular cutter being at approximately the same level.

7. In a rotary core drill, the combination of a core drill head having a central passage therethrough and terminating in a cutting member, a plurality of initial cutters extending outwardly from the lower portion of said head and having lower cutting edges substantially at the same level with the cutting edges of said cutting member, and a pair of reaming cutters extending outwardly on said head above and overlapping the upper ends of said initial cutters and arranged on said head with their forward face in the direction of rotation extending downwardly and forwardly to a cutting edge.

8. In a rotary core drill, the combination of a core drill head having a central core receiving passage, said head terminating in an annular cutter, initial cutters extending outwardly from the lower portion of the core drill head having cutting edges at their lower ends, a secondary set of cutters on said head above said initial cutters having cutting edges at their lower ends below the upper ends of said initial cutters.

9. In a rotary core drill the combination of a core drill head having a central core receiving passage, an annular cutter formed on the lower end of said head, initial cutters extending outwardly from the lower portion of the core drill head having cutting edges at their lower ends, a secondary set of cutters on said head above said initial cutters having cutting edges at their lower ends below the upper ends of said initial cutters, the secondary set of cutters having their cutting edges extending outwardly beyond the cutting edges of the initial cutters.

10. In a rotary core drill the combination of a core drill head having a central core receiving passage, an annular cutter formed on the lower end of said head, initial cutters extending outwardly from the lower portion of the core drill head having cutting edges at their lower ends, a secondary set of cutters on said head above said initial cutters having cutting edges at their lower ends below the upper ends of said initial cutters, the secondary set of cutters having their cutting edges extending outwardly beyond the cutting edges of the initial cutters, said initial and said secondary cutters having their faces in the direction of rotation extending forwardly and downwardly to the cutting edges of the respective cutters.

11. In a rotary core drill, the combination of a core drill head, a core receiving chamber formed in the head, a core receiving barrel secured to the head and communicating with the core receiving chamber, an annular cutter formed at the lower end of said head for forming a solid core, a plurality of initial cutters extending outwardly from the lower portion of said head, and a plurality of reaming cutters located above the initial cutters, said initial cutters and said reaming cutters being arranged to travel in overlapping circular paths.

Signed at Los Angeles, California, this 4th day of February, 1925.

FAY OLIVER.